United States Patent
Rao

(10) Patent No.: US 7,676,364 B2
(45) Date of Patent: Mar. 9, 2010

(54) SYSTEM AND METHOD FOR SPEECH-TO-TEXT CONVERSION USING CONSTRAINED DICTATION IN A SPEAK-AND-SPELL MODE

(76) Inventor: Ashwin Rao, 225 112$^{th}$ Ave. NE. #335, Bellevue, WA (US) 98004

( * ) Notice: Subject to any disclaimer, the term of this patent is extended or adjusted under 35 U.S.C. 154(b) by 1190 days.

(21) Appl. No.: 11/084,964

(22) Filed: Mar. 21, 2005

(65) Prior Publication Data

US 2005/0216272 A1    Sep. 29, 2005

Related U.S. Application Data

(60) Provisional application No. 60/556,296, filed on Mar. 25, 2004.

(51) Int. Cl.
*G10L 15/26* (2006.01)
(52) U.S. Cl. .............. 704/235; 704/251; 704/270; 704/255; 379/88.14
(58) Field of Classification Search ........... 704/251, 704/235, 270, 275, 231, 255, E15.04, E15.044; 379/88.14, 88.13
See application file for complete search history.

(56) References Cited

U.S. PATENT DOCUMENTS

| | | | |
|---|---|---|---|
| 4,914,704 A | | 4/1990 | Cole |
| 5,210,689 A | * | 5/1993 | Baker et al. ............ 704/1 |
| 5,231,670 A | * | 7/1993 | Goldhor et al. ........ 704/275 |
| 5,444,768 A | * | 8/1995 | Lemaire et al. ........ 379/68 |
| 5,855,000 A | * | 12/1998 | Waibel et al. ........ 704/235 |
| 5,970,448 A | * | 10/1999 | Goldhor et al. ........ 704/235 |
| 5,991,720 A | | 11/1999 | Galler |
| 6,064,963 A | * | 5/2000 | Gainsboro ........ 704/270 |
| 6,067,514 A | * | 5/2000 | Chen ........ 704/235 |
| 6,198,808 B1 | * | 3/2001 | Martin ........ 379/88.14 |
| 6,327,566 B1 | * | 12/2001 | Vanbuskirk et al. ........ 704/257 |
| 6,694,296 B1 | * | 2/2004 | Alleva et al. ........ 704/255 |
| 6,912,498 B2 | | 6/2005 | Stevens et al. |
| 6,965,863 B1 | * | 11/2005 | Zuberec et al. ........ 704/270 |
| 7,143,037 B1 | * | 11/2006 | Chestnut ........ 704/251 |
| 2005/0043947 A1 | * | 2/2005 | Roth et al. ........ 704/236 |

FOREIGN PATENT DOCUMENTS

| | | |
|---|---|---|
| WO | WO 99/16051 | 4/1999 |
| WO | WO 01/46649 | 6/2001 |

OTHER PUBLICATIONS

Enhanced Methods for Spelling Names in Speech Recognition Systems. IBM Tech Disclosure Bulletin vol. 38, No. 11, Nov. 1995.
Automatic Spoken Dialoque Systems—Grace Chung; et al. MIT Lab. for Computer Science XP-002473063.

* cited by examiner

*Primary Examiner*—Vijay B Chawan

(57) ABSTRACT

For improving the accuracy of a speech recognition system, for the specific task of speech-to-text (dictation style speech) translation, a constrained dictation methodology using speak-and-spell mode is disclosed. The invention is perfectly suited for modern day "text-messaging" applications wherein the number of words being dictated is very small (limited by the 140-160 characters message length constraint). Additionally, the invention adds a control on the way users interact with machines, thereby making the speech recognition task easier and improving system accuracy.

6 Claims, 3 Drawing Sheets

ATTACHMENT C - New Sheet

SYSTEM AND METHOD FOR SPEECH-TO-TEXT CONVERSION USING CONSTRAINED DICTATION IN A SPEAK-AND-SPELL MODE

CROSS-REFERENCE TO RELATED APPLICATIONS

This application is entitled to the benefit of Provisional Application Ser. No. 60/556,296 filed Mar. 25, 2004.

FIELD OF THE INVENTION

This invention generally relates to user interfaces for speech recognition systems, and particularly to a system and method for converting speech to text using a constrained dictation methodology. By using redundant acoustic information presented by the user in a speak-and-spell mode, the invention significantly improves a speech recognition system's recognition accuracy. Another aspect of this invention is that it controls the behavior of a user attempting to dictate to a speech recognition system.

BACKGROUND OF THE INVENTION

Speech recognition systems may be generally classified into three broad categories based on the task that is being accomplished: (a) Speech-to-Text systems (sometimes referred to as Dictation systems) wherein the task is to recognize continuously spoken words to produce the output; (b) Large Vocabulary Telephony systems; and (c) Embedded Command-and-Control systems wherein the task is to recognize spoken words representing some set phrases that in turn represent some command or a control to the system.

Commercial Speech-to-Text systems include Dragon-NaturallySpeaking, IBM-ViaVoice, Microsoft-Speech, and others. These systems are generally deployed on a personal computer and are useful for dictating letters, documents, medical/legal reports, etc. These Speech-to-Text systems typically resort to stochastic language modeling techniques (referred to as N-Gram); however, limited vocabulary speech-to-text may also be achieved using context free or other finite state grammars. In a Speech-to-Text system, the user is generally allowed to speak in a free-form dictation mode, as in "Please meet me tonight at 10 p.m. in front of the Seattle Train Station; John and I will wait for you in front of the Barnes & Noble book store."

Speech recognition of free-form dictation style speech is a fairly onerous task. It is complicated by what is referred to as "language model perplexity" of the task. The major problem stems from the fact that users could say any word followed by any word(s) from a vocabulary that could range into hundreds of thousands of words. To improve accuracy, many systems resort to techniques like domain specific language modeling, interpolated language modeling, etc. Unfortunately, the problem may be viewed as far from being solved, and hence these systems have had limited commercial success.

Commercial telephony systems include Large Vocabulary systems developed by companies like Nuance, SpeechWorks, etc. These systems typically address telephony applications like banking, stock quotes, call center automation, and directory assistance. These Large Vocabulary systems generally use statistical and/or context free and/or finite grammar based language models. In applications deployed by these systems, the users are restricted to a phrase as in "Stock Quote for Charles Schwab." Using techniques like word spotting and natural language processing, some systems relax this constraint, allowing users to speak freely as in "Please find me a quote for Charles Schwab stock if you don't mind."

Medium/Small vocabulary Command-and-Control systems are offered by many embedded speech recognition companies, including VoiceSignal, Conversay, Fonix, Sensory, ART, and VoCollect. These typically address applications like name-digit dialing for cellular phones, Personal Information Management for personal digital assistants, data entry for industrial environments, etc. The Command-and-Control systems usually resort to finite state grammars. In a Command-and-Control system, the user is generally restricted to say a phrase in a fixed way as in "Tune Radio to 98.3" or "Go To Email-Box."

Telephony and Command-and-Control systems have at times resorted to speak-and-spell mode in multiple scenarios that include: (a) entering a new word in a lexicon; (b) generating pronunciations for words; (c) improving accuracy for tasks like directory assistance or name dialing; and (d) correcting errors made by the recognition system. It is well known that a speech recognition system's accuracy may be improved by asking the users to speak-and-spell the words as in "Call JOHN SMITH spell that J-O-H-N-S-M-I-T-H" as opposed to "CALL JOHN SMITH." For example, the MIT Laboratory of Computer Science has published a research paper (refer to "Automatic Acquisition of Names Using Speak and Spell Mode in Spoken Dialogue Systems", Seneff and Wang, March 2003 herein incorporated by reference) wherein the authors believe that the most natural way to enter data (for their application) would be through the speak-and-spell scenario.

SUMMARY OF THE INVENTION

This invention relates to a system and method for speech recognition of dictation style speech using a constrained dictation methodology. It extends the concept of speak-and-spell mode used by Telephony and Command-and-Control systems to Speech-to-Text systems. The invention exploits the fact that in certain present day applications like "Text-Messaging," including Short Messaging Service (SMS), Instant Messaging (IM), and Email, the length of text (e.g., the message) that a user may dictate is small. For instance, the length of an SMS message is restricted to be 160 characters in the Global System for Mobile Communications (GSM) standard. Hence, a constrained dictation speech recognition methodology, in accordance with the proposed invention, at the user interface is reasonable to impose on users, especially observing that the competing interface, the phone-key-pad, is a clumsy and laborious interface for inputting text into devices. As an example, the user may dictate an SMS to a device (like a cellular phone) by speaking and spelling each word as in, "MEET-M-E-E-T ME-M-E TONIGHT-T-O-N-I-G-H-T AT-A-T 10-T-E-N." Extensions to the invention based on partial spellings and/or inaccurate spellings are also envisioned.

By using redundant acoustic information presented in a speak-and-spell mode, this invention significantly improves a speech-to-text recognition system's recognition accuracy. Further, the invention may be viewed as a mechanism to control the behavior of a user who is attempting to dictate to a speech recognition system.

BRIEF DESCRIPTION OF THE DRAWINGS

The foregoing aspects and many of the attendant advantages of this invention will become more readily appreciated as the same become better understood by reference to the following detailed tables and descriptions.

DETAILED DESCRIPTION OF THE PREFERRED EMBODIMENT

Figure 1A:
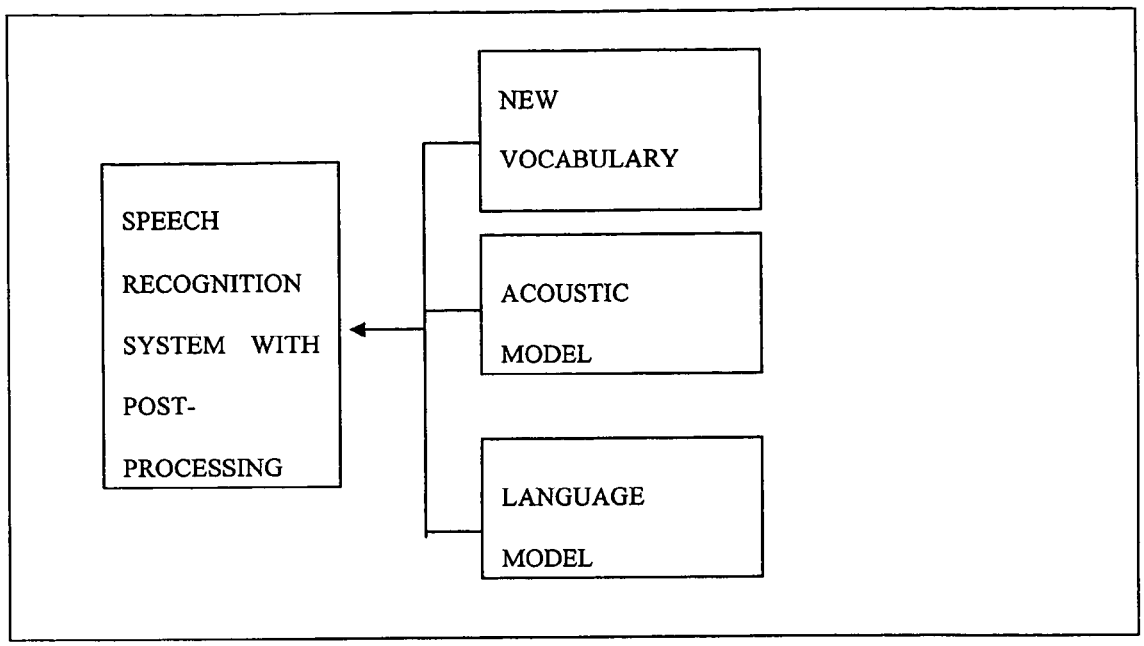
FIGS. 1A and B is a block diagram of a general speech recognition system for implementing the constrained dictation methodology.

It will be appreciated by those skilled in the art and others that a typical speech-to-text recognition system consists of: an audio interface including a microphone and a soundcard combination; a front-end signal processing module for feature extraction; and a search module (also called a decoder) that uses the features in conjunction with an acoustic model, a language model, a lexicon, or a state network for finding the word that best matches the features. Depending on the specific task and application, the speech-to-text system may be implemented using a statistical language model (referred to as n-gram models) or a context-free-grammar or a fixed-grammar network, etc. Further, the system itself may reside as software, may be burnt onto a read-only-memory, or may be implemented in a distributed architecture.

TABLE 1

CONSTRAINED DICTATION METHODOLOGY:
USE SPEAK-AND-SPELL MODE TO
DICTATE: FOR EACH WORD, SAY
THAT WORD FOLLOWED BY ITS SPELLING.
EXAMPLE:
CALL-C-A-L-L ME-M-E HOME-H-O-M-E
IMMEDIATELY-I-M-M-E-D-I-A-T-E-L-Y

TABLE 1 illustrates one embodiment of constrained dictation using speak-and-spell mode.

TABLE 2

VARIANTS OF CONSTRAINED
DICTATION METHODOLOGY:
1. FOR EACH WORD, SAY THAT
WORD FOLLOWED BY THAT WORD'S
FIRST 3 CHARACTERS
EXAMPLE:
CALL-C-A-L ME-M-E HOME-H-O-M
IMMEDIATELY-I-M-M
2. FOR EACH WORD, SAY THAT
WORD FOLLOWED BY THAT WORD'S
PARTIAL SPELLING; IT IS OK
TO MISSPELL THE WORD
EXAMPLE:
CALL-C ME-M-E HOME-H-O-M
IMMEDIATELY-I-M-E-D

TABLE 2 illustrates some variants of the embodiment in TABLE 1.

TABLE 3

GRAMMAR FILE (BNF-FORMAT) FOR IMPLEMENTING
CONSTRAINED DICTATION METHODOLOY; For example,
"Please meet me tonight at 10 in front of the Seattle Train Station.
Will wait for you in front of the Barnes book store" Other words
based on the active vocabulary required by the application may be added.

-----------------------------------BEGIN FILE-----------------------------------
<WORD> : : = <WORDS>.
<WORDS> : : =

TABLE 3-continued

GRAMMAR FILE (BNF-FORMAT) FOR IMPLEMENTING
CONSTRAINED DICTATION METHODOLOY; For example,
"Please meet me tonight at 10 in front of the Seattle Train Station.
Will wait for you in front of the Barnes book store" Other words
based on the active vocabulary required by the application may be added.

<WORD> |
<WORD><WORDS>.
<WORD> : : =
PLEASE_P_L_E_A_S_E |
MEET_M_E_E_T |
ME_M_E |
TONIGHT_T_O_N_I_G_H_T |
AT_A_T |
10_T_E_N |
IN_I_N |
FRONT_F_R_O_N_T |
OF_O_F |
THE_T_H_E |
SEATTLE_S_E_AT_T_L_E
TRAIN_T_R_A_I_N |
STATION_S_T_A_T_I_O_N
WILL_W_I_L_L |
WAIT_W_A_I_T |
FOR_F_O_R
YOU_Y_O_U
FRONT_F_R_O_N_T |
BARNES_B_A_R_N_E_S |
BOOK_B_O_O_K |
STORE_S_T_O_R_E.
-----------------------------------END FILE-----------------------------------

Comment: words occurring multiple times are used in STATE <WORD> only once since the grammar rule accounts for this.

Table 3 illustrates a general method for designing speech recognition systems using a grammar file to implement the constrained dictation scheme methodology.

TABLE 4

EXAMPLE DICTIONARY FILE (ASCII-FORMAT)
FOR IMPLEMENTING CONSTRAINED-DICTATION
USING SPEAK-AND-SPELL MODE

-----------------------------------BEGIN FILE-----------------------------------
| | |
|---|---|
| PLEASE | PronPLEASE+PronP+PronL+PronL+PronE+PronA+PronS+PronE |
| MEET | PronMEET+PronM+PronE+PronE+PronE |
| ME | PronMEET+PronM+PronE |
| TONIGHT | PronTONIGHT+PronT+PronO+PronN+PronI+PronG+PronH+PronT+ |
| AT | PronAT+PronA+PronT+ |
| TEN | Pron10+PronT+PronE+PronN |
| : : : | : : : |
| : : : | : : : | other words in the lexicon
-----------------------------------END FILE-----------------------------------

COMMENT:
1) IN ABOVE FILE, $1^{ST}$ COLUMN IS THE WORD AND $2^{ND}$ COLUMN IS ITS PRONUNCIATION.
2) PronWORD IMPLIES THE PRONUNCIATION FOR WORD, "WORD", WHICH DEPENDS ON THE BASE PHONEMES (AND THEIR SYMBOLS) USED BY THE RECOGNITION SYSTEM; example PronP is Pronunciation for word "P"
3) THE "+" SIGN DENOTES STRING-CONCATENATION.

TABLE 4 illustrates a general method for designing speech recognition systems using a statistical language model to implement the constrained dictation methodology.

TABLE 5

POST-PROCESSING STEP (COULD BE DONE AT THE LEVEL OF
THE RECOGNIZER'S SEARCH MODULE OR AT THE
LEVEL OF THE API-INTERFACE OR OTHERWISE):

----------------------------------PSEUDO-CODE----------------------------------
GET THE OUTPUT OF THE RECOGNIZER.
FOR EACH WORD,
    STRIP ALL CHARACTERS BEGINNING FROM THE
    UNDERSCORE TILL THE END
END
// EXAMPLE: 'MEET_M_E_E_T' SHOULD BECOME 'MEET'
AFTER THE ABOVE PROCESSING

TABLE 5 illustrates the post-processing step (which basically converts the recognizer's output to the desired form) that may be used to implement the constrained dictation methodology.

Figure 1B:
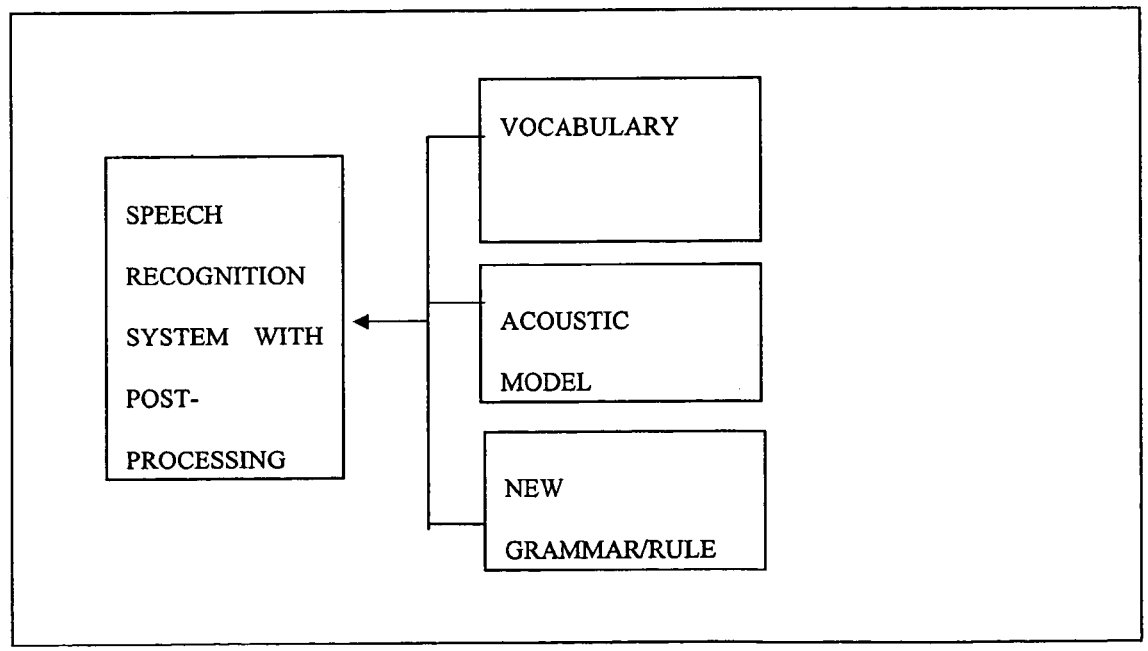
Figure 3:
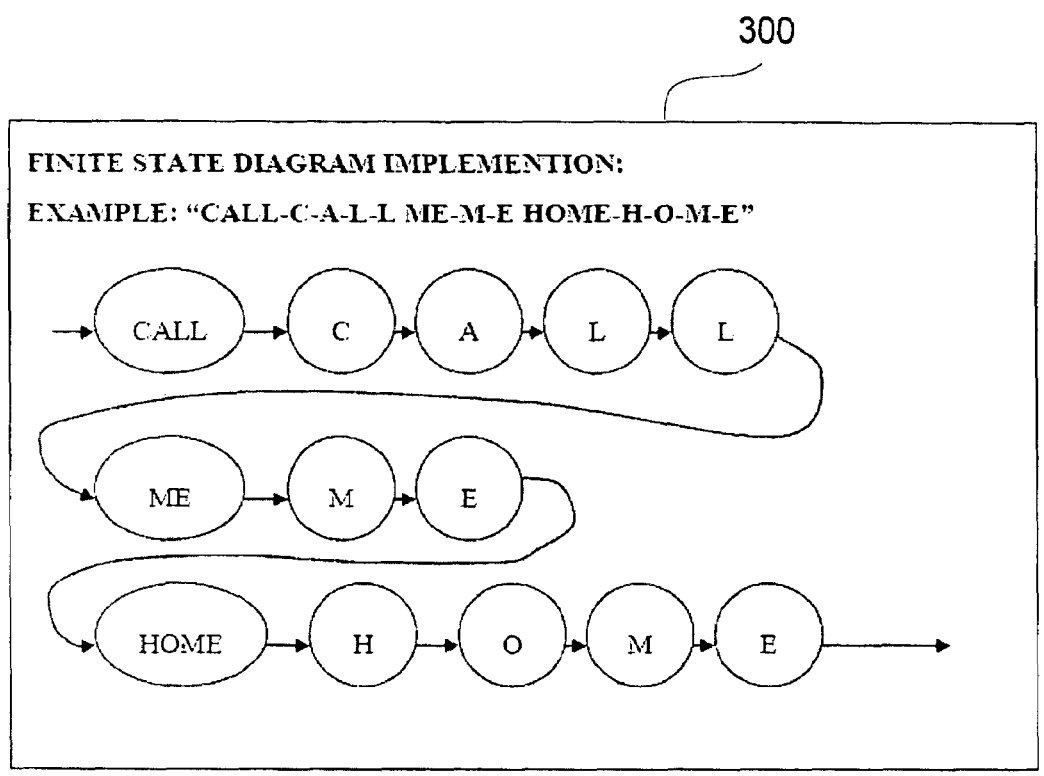

In one embodiment of the invention, a speech recognition system for recognizing and interpreting words (in any language), by resorting to a constrained dictation methodology using speak-and-spell mode, is designed by (a) designing an appropriate user interface to prompt the users for using the speak-and-spell mode, as per TABLE 1; (b) modifying an existing language model file (see FIG. 3, TABLE 3, TABLE 4) for implementing the speak-and-spell mode; (c) capturing a word followed by its partial spelling spoken by a user as an audio speech signal; (d) recognizing the inputted word using knowledge from the modified language model, in conjunction with the system's acoustic model and lexicon; and (e) generating programming code or system module to post-process the recognizer's standard output as shown in TABLE 5, and subsequently output the desired text output. The resulting system may be generally visualized as shown in FIGS. 1A and 1B. FIG. 3 illustrates a more general finite state diagram 300 interpretation for implementing the constrained dictation scheme in TABLE 1.

The constrained methodology using speak-and-spell mode as described above may be implemented for a Large Vocabulary, Speech-to-Text system by simply modifying the Dictionary file as shown in TABLE 4. The statistical language model, usually a separate file, stays the same since the addition of spellings does not alter the n-gram probabilities of occurrences of words. To allow for some pause between the words and their respective spellings (which may be expected in a speak-and-spell mode), optimizations may be done at the word-duration-model level and/or techniques like intra-word-pausing-modeling may be employed. It will be appreciated by those skilled in the art and others that, in addition to the above-described way of implementing the constrained dictation method, other ways (as best suited to the overall system) may be implemented that include modifications to the Decoder, Language Modes, Acoustic Models, etc.

Notice that the speech recognition system described above is well suited for applications like Text-Messaging wherein the number of words being dictated is relatively small (in the order of tens of words) compared to standard dictation applications (like dictation of a letter or a report or a medical/legal document) wherein the number of words may run into hundreds and thousands. Hence, such a system when used for speech-to-text translation for applications like Text-Messaging results in improved speech recognition accuracy, because the redundant acoustics in the partial spellings of words provide additional information to the pattern-recognition-module of the system, enabling it to do a better job in discriminating confusing words.

Further notice that the speech recognition system in accordance with this invention may be viewed as a method/apparatus to control the behavior of users dictating to computers or devices. For instance, in open dictation approach the user could speak freely and add "garbage" words as in "UMM call me home AHH WELL LET ME SEE at around 9". However, if the user is asked to speak-and-spell it is more likely that he/she would say "call-C-A-L-L me-M-E at-A-T home-H-O-M-E at-A-T 9-N-I-N-E."

Those skilled in the art and others may easily appreciate that the system as embodied by this invention may be further enhanced by using special techniques including speaker acoustic/language model adaptation, acoustic modeling using data that exhibits a speak-and-spell recording style, etc.

Figure 2:
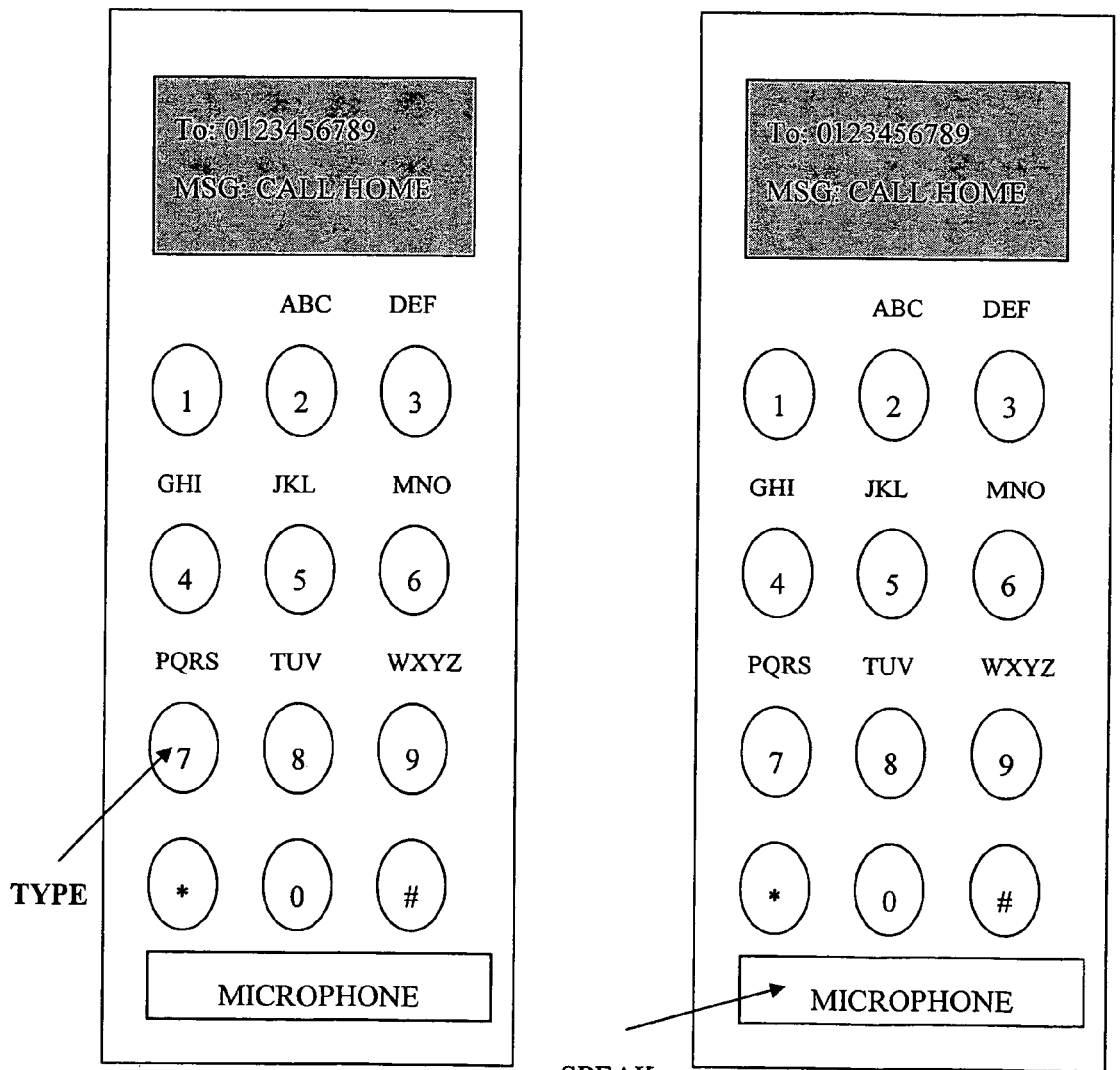
FIG. 2 illustrates an application of the invention for "Text-Messaging" wherein the invention is either viewed as a multi-modal interface that complements the existing "key" interface or as the only interface in certain eyes-busy-hands-busy situations like when driving a vehicle.

Clearly, a user interface in accordance with this invention has the advantage of being easily adapted to by anyone who can speak. It allows users to conveniently dictate text in eyes-busy hands-busy situations like when driving an automobile. As depicted in FIG. 2, the invention may be naturally viewed as a method/apparatus for dictating short text messages, as in text-messaging, into small form factor embedded devices like cellular phones, using real-time visual and audible feedback. In such applications, notice that the proposed interface is faster, more intuitive, useful in eyes-busy-hands-busy conditions, and hence may be more user friendly for consumers of such applications compared to existing interfaces (like "Triple Tapping" where to enter a character "C" user has to tap the key "2" three times).

While the preferred embodiment of the invention has been illustrated and described, it will be appreciated that various changes can be made therein without departing from the spirit and scope of the invention.

I claim:

1. A system for converting speech to text comprising:
   a) an interface requesting a user to speak a word and to speak a spelling of said word for each of a plurality of words spoken during a communication;
   b) an audio receiving module for receiving said spoken word and spoken spelling of said word;
   c) a signal processing module for extracting specific features of the spoken word and said spelled word;
   d) a search module that uses said extracted specific features in conjunction with an at least one acoustic module;
   e) at least one language module that matches a result presented by the search module; and
   f) at least one constrained lexicon that takes the resulting match and using a system module outputting the desired text matching the spoken word.

2. The system of claim 1 wherein the at least one language module incorporates a network of phonemes followed by a network of alphabets.

3. A method for converting speech to text comprising:
   a) requesting a user to speak a word and to speak a spelling of said word for each of a plurality of words spoken during a communication;
   b) receiving said spoken word and spoken spelling of said word using an audio receiving module;
   c) extracting specific features of the spoken word and said spelling of said spoken word using a signal processing module;
   d) using said extracted specific features in conjunction with an at least acoustic module using a search module;
   e) matching a result presented by the search module using an at least one language module; and
   f) taking the results that match an at least one constrained lexicon outputting the desired text matching the spoken word.

4. The method of claim 3 wherein the at least one language module incorporates a network of phonemes followed by a network of alphabets.

5. A means for converting speech to text comprising:
 a) means for requesting a user to speak a word and to speak a spelling of said word for each of a plurality of words spoken during a communication;
 b) means for receiving said spoken word and spoken spelling of said word using an audio receiving module;
 c) means for extracting specific features of the spoken word and said spelling of said spoken word using a signal processing module;
 d) means for using said extracted specific features in conjunction with an at least one acoustic module using a search module;
 e) means for matching a result presented by the search module using an at least one language module; and
 f) means for taking the results that match an at least one constrained lexicon outputting the desired text matching the spoken word.

6. The means of claim 5 wherein the at least one language module incorporates a network of phonemes means followed by a network of alphabet means.

* * * * *